N. L. OLSON.
TRACTOR WHEEL.
APPLICATION FILED JULY 16, 1915.
1,180,938.
Patented Apr. 25, 1916.
2 SHEETS—SHEET 1.
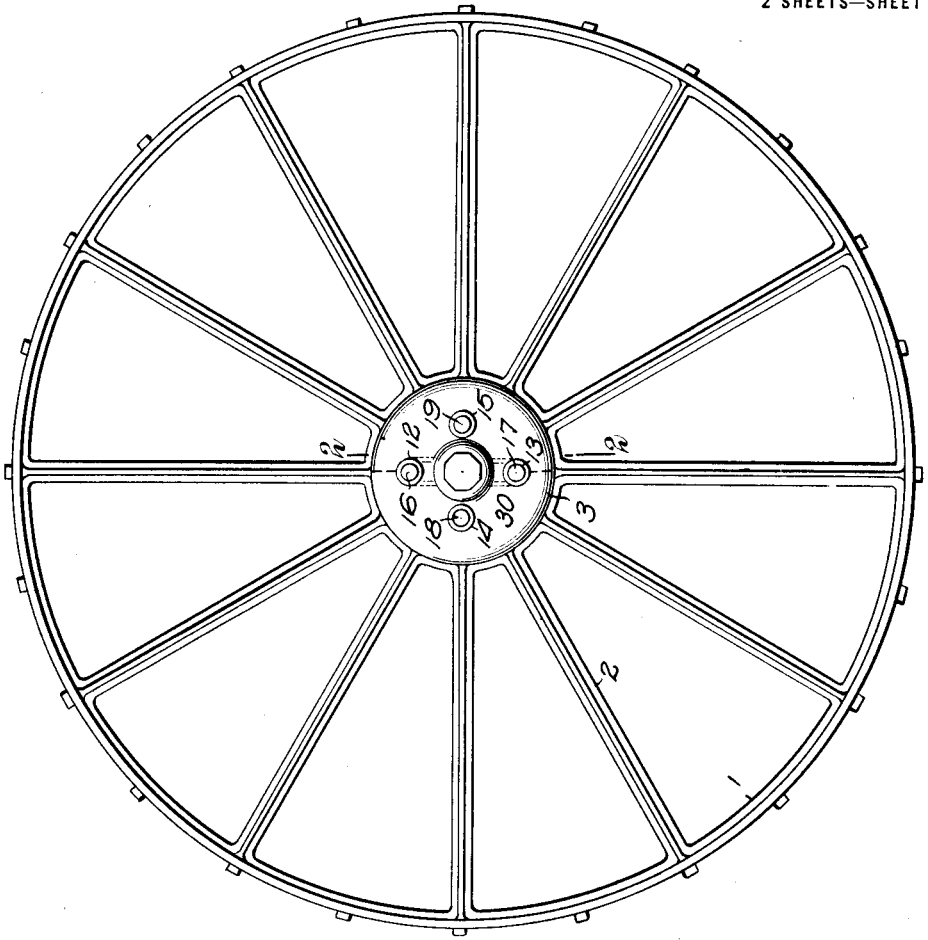
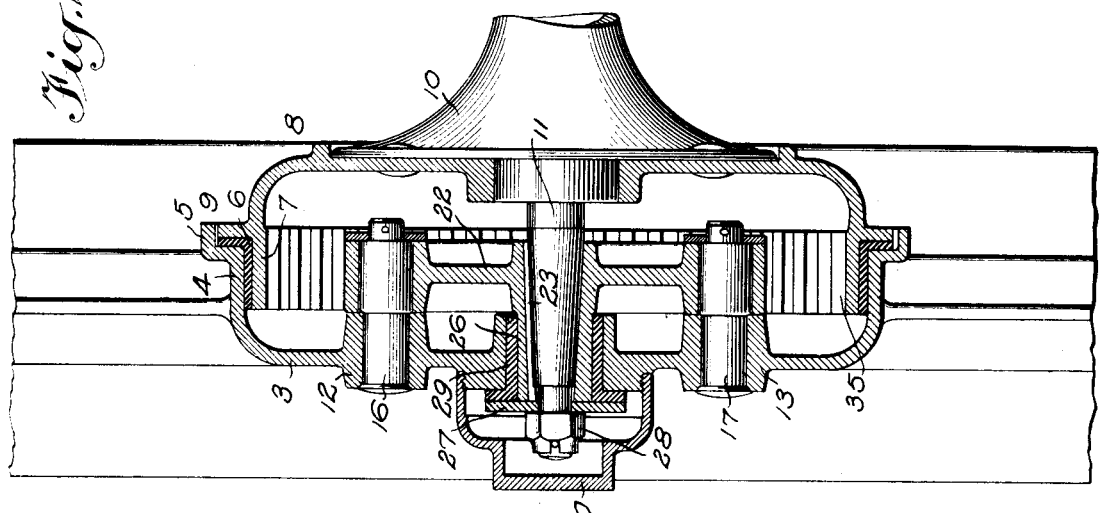
WITNESSES
INVENTOR
Nels Liner Olson
BY
ATTORNEYS N. L. OLSON.
TRACTOR WHEEL.
APPLICATION FILED JULY 16, 1915.
1,180,938.
Patented Apr. 25, 1916.
2 SHEETS—SHEET 2.
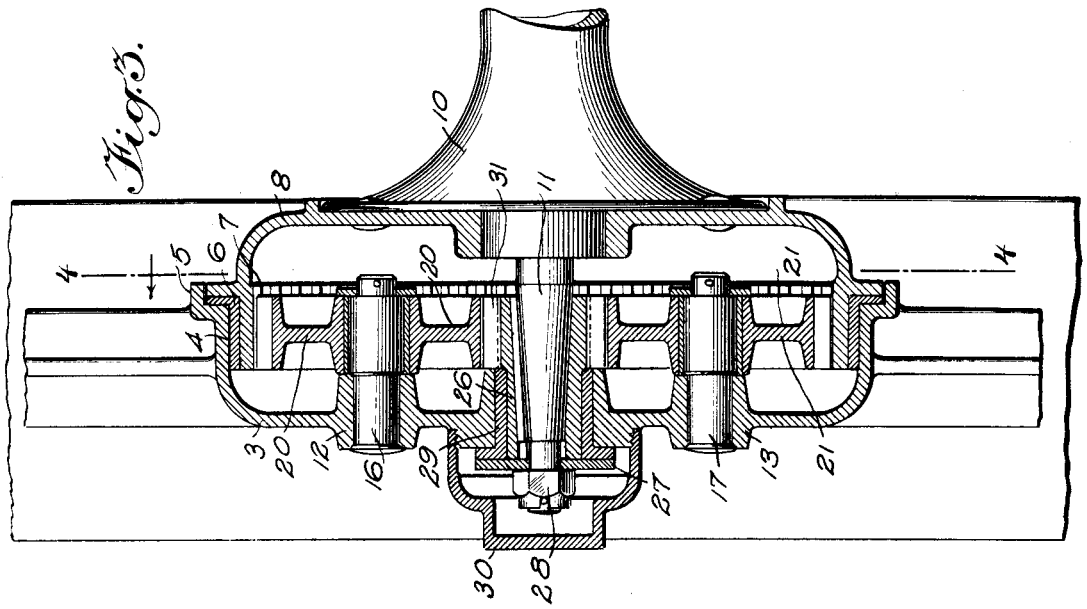
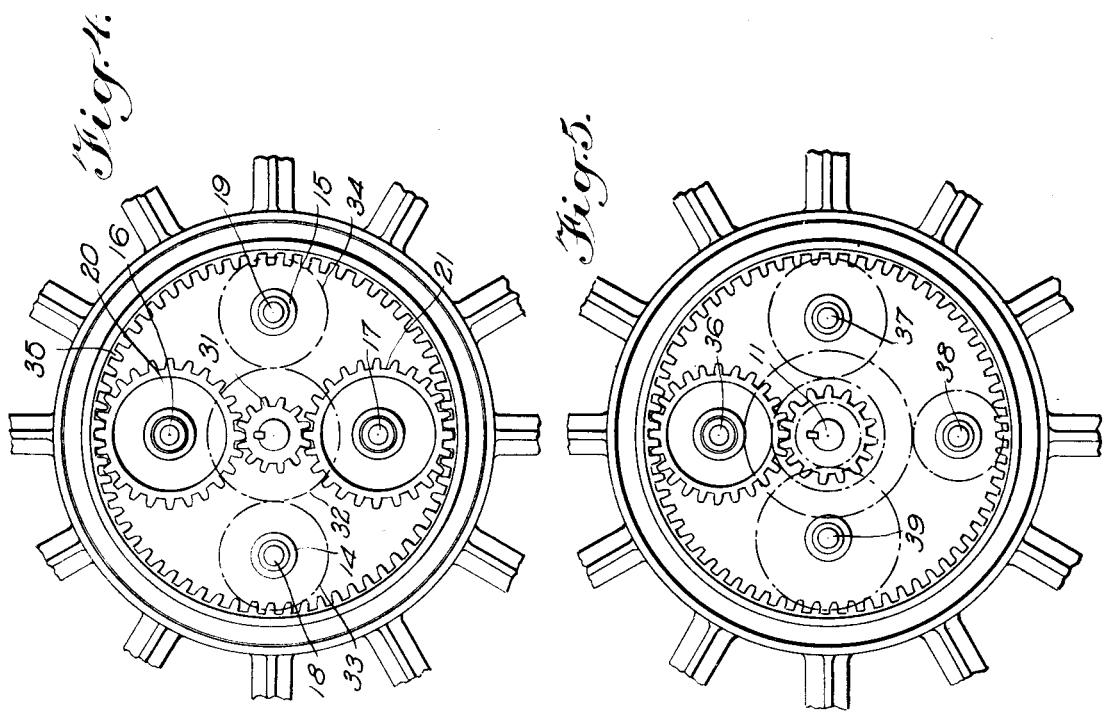
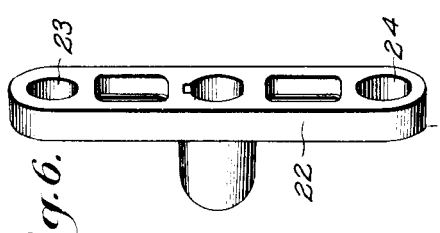
WITNESSES
INVENTOR
Nels Liner Olson
BY
ATTORNEYS

UNITED STATES PATENT OFFICE.

NELS LINER OLSON, OF HIGHLAND PARK, MICHIGAN.

TRACTOR-WHEEL.

1,180,938.  Specification of Letters Patent.  Patented Apr. 25, 1916.

Application filed July 16, 1915. Serial No. 40,201.

*To all whom it may concern:*

Be it known that I, NELS LINER OLSON, a citizen of the United States, and a resident of Highland Park, in the county of Wayne and State of Michigan, have invented a new and Improved Tractor-Wheel, of which the following is a full, clear, and exact description.

This invention relates to wheels and particularly to power or traction wheels and has for an object the provision of an improved simplified construction which may be variously coupled up so as to have a direct drive or a slow or fast drive.

Another object in view is to provide a tractor wheel which may be adjusted for producing different speeds as may be desired.

A still further object in view is to provide a tractor wheel in which a plurality of interacting gears are used for producing different speeds, a different set of gears being utilized for each speed.

In the accompanying drawings:—Figure 1 is a side view of a wheel embodying the invention; Fig. 2 is a section through Fig. 1 on line 2—2, the same being on an enlarged scale; Fig. 3 is a section similar to Fig. 2 but showing the parts differently arranged for producing a different speed to that shown in Fig. 2; Fig. 4 is a sectional view through Fig. 3 on line 4—4, the same being on a slightly reduced scale; Fig. 5 is a view similar to Fig. 4 but disclosing a different arrangement of gears to that shown in Fig. 4; Fig. 6 is a detail perspective view of the bar used in Fig. 2 for producing a direct drive.

In constructing a wheel embodying the invention it is aimed to produce a wheel that may be connected with a source of power in a plurality of ways. Means are provided which will connect the wheel directly with the power and other means are provided which will present multiplying mechanism whereby the wheel will rotate at a slower speed but with greater power than when driven directly.

Referring to the accompanying drawings by numerals, 1 indicates a rim of any desired kind and 2 spokes which are connected with hub 3 in any suitable manner. The hub 3 is provided with a bearing portion 4 having an overhanging flange 5, said bearing portion 4 resting upon an antifriction ring 6 which in turn rests upon a bearing portion 7 of the casing 8, which casing is also provided with a flange 9. The casing 8 is bolted or otherwise rigidly secured to the hollow shaft 10, which shaft carries a driving axle 11.

The hub 3 is provided with inwardly and outwardly extending bosses 12 and 13, respectively, and also with bosses 14 and 15, respectively. These bosses carry pins 16, 17, 18 and 19, as shown in Fig. 4, on which wheels of various sizes may be mounted. Pins 16 and 17 carry the gear wheels 20 and 21 respectively, when a slower speed is desired than a direct drive will give. When a direct drive is desired the bar 22 shown in detail in Fig. 6 is used. This bar is provided with apertures 23 and 24 fitting over the pins 16 and 17, respectively, and also fitting over the end of axle 11 to which it is secured by a suitable spline 25. By this construction and arrangement whenever axle 11 is actuated by the power means the hub 3 and parts connected therewith will also be actuated. It will be noted that the bar 22 is provided with an elongated hub 26 for properly fitting the end of axle 11 so that the same may be properly held in place by a suitable washer 27 and a nut 28 of the usual type. A member 29 may be used to fill the space between hub 3 and the elongated hub 26. A protecting cap 30 may also be mounted on hub 3 if desired to protect the various parts against dust and other foreign matter.

When it is desired to have a different speed, as for instance, a speed of 1 to 4, gear wheels 20 and 21 are utilized which mesh with the pinion 31, which pinion is connected with the axle 11 in a similar manner to the way the bar 22 is shown connected thereto in Fig. 2. If a different speed is desired from that produced by the gear wheels 20 and 21 a larger pinion 32 is substituted for pinion 31, which larger pinion meshes with the gears 33 and 34. It will be noted that the various outer gear wheels on the various pins 16 to 19, inclusive, are adapted to mesh continually with a gear ring or rack 35 rigidly secured to or formed integral with the casing 8.

In Fig. 4 it will be observed that the pins 16 and 17 are an equal distance from the center of axle 11, while the pins 18 and 19 are also an equal distance from the center of axle 11 but a different distance from said axle to the pins 16 and 17. This allows different size gear wheels to be arranged on the different pins and on the axle for changing the speed. It will also be noted that two gear wheels of the same size are used in each instance in the construction shown in Fig. 4 and consequently only two speeds are provided in said structure in addition to the direct drive.

In Fig. 5 the pins 36, 37, 38 and 39 are all spaced different distances from the center of axle 11 whereby a new gear or pinion must be placed on axle 11 each time a different pin is used; for instance, as shown in the drawings, the pin 36 is used with a wheel that will produce a speed of about 1 to 4, while the gear on pin 37 will produce a speed of about 1 to 3, and the gear wheels on pins 38 and 39 will produce a speed of from 1 to 2 and 1 to 5, respectively. It is evident that these speeds may be varied without departing from the spirit of the invention and are merely given as illustrating the adaptability of the structure for producing any speed desired. It is to be noted that in this form of the invention the drive is through the gear mounted on axle 11 and one of the gears mounted on pins 36 to 39, inclusive.

By arranging the parts as shown in Fig. 2 a direct drive may be produced, while if the parts are arranged as shown in Fig 4 a 2-speed drive may be produced. As shown in Fig 1, it is intended to illustrate the fact that a large number of speeds may be secured by merely rearranging the position of the pins carrying the outer gear wheels. The adjustability of the drive is such that any desired speed may be secured but the parts cannot be adjusted for changing the speed while the wheel is in use. In order to change the speed the wheel must remain stationary while the various gears are being interchanged. This will allow the device to be used on tractors for plowing or tractors for pulling loads along the road or any other suitable place where a considerable power is desired and where various speeds may be utilized.

What I claim is:

1. In a draft device of the character described, a wheel including a hub, a stationary rack extending into said hub, means for supporting said rack, a live shaft arranged centrally of said hub, said live shaft being adapted to receive driving gears of different sizes, a set of planetary gears for each driving gear, said planetary gears revolving inside said rack and meshing therewith, said planetary gears being mounted on said hub and transmitting motion thereto, one set of planetary gears being larger than the other and one set of gears being used at a time, whereby two speeds are produced.

2. In a draft device of the character described, a wheel including a hub, a stationary internal gear extending into said hub, means for supporting said internal gear, a live shaft arranged centrally of said hub, said live shaft being adapted to receive driving gears of different sizes, a plurality of planetary gears, a series of pins arranged on said hub, there being one pin for each of the planetary gears, said pins being arranged at different distances from the center of said live shaft, said planetary gears being of different sizes to correspond to the different sizes of driving gears, said planetary gears also being used one at a time and when used meshing with the driving gears corresponding thereto and with the stationary internal gear.

3. In a draft device of the character described, a wheel proper comprising a rim, spokes and a hub structure, a pin arranged on said hub structure, a stationary gear ring arranged adjacent said hub structure, and interchangeable means for connecting a live shaft with said pin, said means comprising a bar adapted to be rigidly connected with said shaft and with said pin when a direct drive is desired and said means also comprising a gear adapted to be rigidly connected with said shaft and a second gear loosely mounted on said pin for connecting said first mentioned gear with said gear ring, said last mentioned means acting for producing a different speed from a direct drive.

4. In a traction device of the character described, a wheel or body including a hub, a plurality of pins arranged on said hub, said pins being spaced different distances from the center of the hub, a gear wheel for each of said pins, each of said gear wheels being of a different size, a gear ring, means for holding said gear ring stationary, said gear ring being adapted to mesh with any of said gear wheels, and a live shaft arranged centrally of said hub adapted to receive different size gear wheels for meshing with the respective gear wheels heretofore mentioned, said first mentioned gear wheels being used at different times and producing different speeds.

5. In a tractor device of the character described, a wheel including a hub, a plurality of pins arranged in said hub at different distances from the center, a stationary rack extending into said hub, means for supporting said rack, a live shaft arranged centrally of said hub, said live shaft being adapted to receive gear wheels of different sizes and said pins being adapted to receive gear wheels of different sizes connecting said stationary rack with the particular gear wheel arranged on said live shaft, the size of the gear wheel on said live shaft and the size of the particular gear wheel used on said respective pins determining the ratio of speed between the wheel and the live shaft.

6. In a device of the character described, a body including a hub, a pair of pins arranged on said hub, a live shaft arranged centrally of said hub, said live shaft being adapted to receive a pinion, said pins being adapted to receive gear wheels, said gear wheels and said pinion meshing, a stationary rack for meshing with said gear wheels, and a direct drive bar adapted to be substituted for said pinion and said gear wheels, said direct drive bar connecting said live shaft and said pins rigidly.

7. In a tractor device of the character described, a body formed with a hub, said hub being provided with a central bearing boss and a plurality of bearing bosses spaced therefrom radially, certain of said bearing bosses being spaced different distances from the center of said central bearing boss than the remaining bearing bosses, a pin adapted to be carried by each of said last mentioned bearing bosses, a stationary rack extending into said hub, means for supporting said stationary rack, a live shaft extending into said hub, said live shaft being adapted to receive pinions of different sizes and said pins being adapted to receive gears of different sizes, said last mentioned gears being used independently and connecting the pinion mounted on said live shaft and said rack, the relative sizes of said pinion and gear wheels determining the ratio of speed communicated by said live shaft to said hub.

8. In a tractor device of the character described, a body including a hub, a stationary member projecting into said hub, and means arranged in said hub and engaging said stationary member for driving said hub, said means including interchangeable sets of gearing which are adapted to drive said hub at different speeds.

9. In a tractor device of the character described, a body provided with a hub having a plurality of bosses, a pin extending through each of said bosses, said bosses and said pins being arranged different distances from the center of the hub, a stationary rack projecting into said hub, means for supporting said stationary rack, a planetary gear wheel adapted to be mounted on each of said pins, said planetary gear wheels being used at different times, driving gear wheels adapted to mesh with the plentary gear wheels on said pins, there being a different sized driving gear wheel for each of said planetary gear wheels, and a live shaft for said driving gear wheel, said live shaft being arranged centrally of said stationary rack and being adapted to receive the driving gear wheels at different times to correspond with the different planetary gear wheels.

In testimony whereof I have signed my name to this specification in the presence of two subscribing witnesses.

NELS LINER OLSON.

Witnesses:
ANNA M. DORR,
LEWIS E. FLANDERS.